United States Patent [19]

Yoshikawa et al.

[11] Patent Number: 5,570,232
[45] Date of Patent: *Oct. 29, 1996

[54] ANAMORPHIC SINGLE LENS FOR USE IN AN OPTICAL SCANNER

[75] Inventors: Motonobu Yoshikawa, Osaka; Yoshiharu Yamamoto, Toyonaka, both of Japan

[73] Assignee: Matsushita Electric Industrial Co., Ltd., Osaka, Japan

[*] Notice: The term of this patent shall not extend beyond the expiration date of Pat. No. 5,225,113.

[21] Appl. No.: 113,663

[22] Filed: Aug. 31, 1993

[30] Foreign Application Priority Data

Sep. 1, 1992 [JP] Japan ..................... 4-233390

[51] Int. Cl.⁶ ................................. G02B 13/08
[52] U.S. Cl. .......................... 359/668; 359/662
[58] Field of Search .................. 359/668, 710, 359/711, 718, 719, 721, 662

[56] References Cited

U.S. PATENT DOCUMENTS

| | | |
|---|---|---|
| 4,915,484 | 4/1990 | Yamamoto .............. 359/668 |
| 5,157,532 | 10/1992 | Yoshikawa et al. . |
| 5,200,850 | 4/1993 | Iizuka et al. . |
| 5,255,113 | 10/1993 | Yoshikawa et al. ............ 359/196 |

FOREIGN PATENT DOCUMENTS

| | | |
|---|---|---|
| 0286368 | 10/1988 | European Pat. Off. . |
| 0444603A2 | 9/1991 | European Pat. Off. . |
| 0507344 | 10/1992 | European Pat. Off. . |
| 0559423 | 9/1993 | European Pat. Off. . |
| 61-254915 | 11/1986 | Japan . |

Primary Examiner—Georgia Y. Epps
Assistant Examiner—Jordan M. Schwartz
Attorney, Agent, or Firm—Wenderoth, Lind & Ponack

[57] ABSTRACT

An anamorphic single lens has its radii in respective directions determined by the transfer efficiency of beams and imaging positions in respective directions, as required by the overall optical scanner. The anamorphic single lens satisfies the following formulae:

$$0.6 < \frac{TH}{fm} < 2 \quad \text{(Formula 1)}$$

$$S' < S \quad \text{(Formula 2)}$$

where $fm$ is the focal length of the lens in the direction of beams diverged at a larger angle, TH is the thickness, S is the distance from a light source side principal point position (6) to the light source (5) in the direction of the beams diverged at the larger angle, and S' is the distance from a light source side principal point position (8) to the light source in the direction of beams diverged at a smaller angle.

11 Claims, 4 Drawing Sheets

ANAMORPHIC SINGLE LENS FOR USE IN AN OPTICAL SCANNER

BACKGROUND OF THE INVENTION

1. Field of the Invention

The present invention relates to an anamorphic single lens used for elevating the transfer efficiency of beams or other similar purposes in an optical scanning system, particularly in a post-objective type optical scanning system in which laser beams are bundled and turned into a focusing pencil of rays and thereafter deflected by a polygonal mirror.

2. Description of the Prior art

In recent years, there has been studied and developed a post-objective type optical scanner in which laser beams are turned into a focusing pencil of rays and thereafter deflected by a polygonal mirror. Such an optical scanner has been manufactured as a commodity through research and development, thereby permitting a realization of miniaturization in size and reduction in cost.

In the overall optical system, however, since the focal length in the main scanning direction is ten or more times as large as that in the sub-scanning direction, in order to have an equal spot size on the image surface in the main scanning and sub-scanning directions, the configuration of an aperture stop placed before the polygonal mirror needs to be a rectangle or a long ellipse having a ratio of its width in the main scanning direction to that in the sub-scanning direction of 10:1 or higher. For this reason, the necessary transfer efficiency of the beams cannot be obtained merely by collimating the semiconductor laser beams. For solving this problem, a method utilizing prisms has been available as shown in FIGS. 6, 7(a) and 7(b).

FIG. 6 shows an optical scanner utilizing prisms, where reference numeral 41 denotes a semiconductor laser; 42 a collimating lens; 43 and 44 prisms; 45 an aperture stop; 46 a focusing lens; 47 a cylindrical lens; 48 a mirror; 49 a polygonal mirror having cylindrical surfaces; 50 a compensating lens; and 51 a photosensitive drum.

Referring to FIGS. 7(a) and 7(b), the semiconductor laser 41 for emitting light beams is arranged such that the direction of the beams emitted at a larger divergence angle, is coincident with the main scanning direction. The light beams emitted from the semiconductor laser 41 are turned into parallel beams through the collimating lens 42, having an intensity distribution in the form of an ellipse with a ratio of about 3:1 of the beam diameter in the main scanning direction to that in the sub-scanning direction. Then the beams are contracted in diameter only in the sub-scanning direction by the prisms 43 and 44, thereby turning the beams into parallel beams having an intensity distribution ratio of about 10:1 in diameter in the form of an elongated ellipse. Thereafter, the beams pass through the aperture stop 45, focusing lens 46 and the cylindrical lens 47, and then the beams are applied to the polygonal mirror 49 by way of the mirror 48.

As a single lens for performing the functions of the collimating lens and prisms, there is known a lens for use in an optical disk as is disclosed in the Japanese Patent Laid-Open (Unexamined) 61-254915 (published in 1986).

However, the method of using prisms results in complex structure, posing problems of high cost and difficulty in miniaturization. The lens disclosed in the above Japanese Patent Laid-Open Publication 61-254915 has a toric surface represented simply by a radius of curvature, posing a problem of being impractical because of large residual spherical aberration. Further, since such a lens has a function of reshaping flat beams into circular ones, there is a problem in that it is ineffective even when the lens is used in a post-objective type optical scanner.

SUMMARY OF THE INVENTION

Therefore, an essential objective of the present invention is to provide an anamorphic single lens for use in an optical scanner which is capable of singly performing the functions of a collimating lens, two prisms, and, further, a cylindrical lens.

In order to attain the above-mentioned objective, the present invention provides an anamorphic single lens which has different powers between the horizontal and the vertical directions for forming parallel, convergent or divergent pencil of rays from light beams emitted by a light source which manifests different divergence angles of beams between the horizontal direction and the vertical direction. The anamorphic single lens has a construction as described hereunder.

Assuming that the focal length of the anamorphic single lens in the direction of the beams emitted at a larger divergence angle is fm and the lens thickness is TH, the distance to the light source from the principal point position of the lens on the light source side in the direction of the beams emitted at the larger divergence angle is S, and the distance to the light source from the principal point position on the light source side in the direction of the beams emitted at a smaller divergence angle is S', the following formulae (1) and (2) are met:

$$0.6 < \frac{TH}{fm} < 2 \quad \text{(Formula 1)}$$

$$S' < S \quad \text{(Formula 2)}$$

A first surface on the incoming side of the lens, where "first" is as numbered from the light source side, is a toric surface which has high order expansion terms that are quartic or higher, which contribute to aberration correction only in the direction of the light beams emitted at the smaller divergence angle, the first surface having a first curvature in the direction of the beams emitted at the larger divergence angle to form a concave surface and having a second curvature in the direction of the beams emitted at the smaller divergence angle to form a convex surface, respectively toward the light source.

A second surface located at the outgoing side of the lens is a toric or cylindrical surface having high order expansion terms that are quartic or higher, which contribute to aberration correction only for light beams emitted at a larger divergence angle, the second surface having a curvature in the direction of the beams emitted at the larger divergence angle to form a convex or a cylindrical surface toward the image surface.

The curvatures of the lens surfaces on the incoming and outgoing sides in the respective directions, the high order expansion terms, and the lens thickness are determined as in the following steps.

First, the NA value on the object side and the NA value on the image side of the lens respectively in each of the main and sub-scanning directions are determined depending on the transfer efficiency of the beams and based on the resolution which is necessarily demanded by the overall optical system. Then, depending on the imaging position in each direction, the distance (BF) between the outgoing surface and the imaging point is determined in each direction.

Then the lens thickness (TH) and the distance (ff) from the light source to the lens incoming surface are determined as design parameters, to thereby design the incoming and outgoing side curvatures and the high order expansion terms. At this time, the high order expansion terms are introduced in the direction of the beams emitted at a smaller divergence angle on the incoming side, while the terms are introduced in the direction of the beams emitted at a larger divergence angle on the outgoing side. As a result, the spherical aberration in the orthogonal directions may be reduced to almost zero, but some aberration will be left in the 45 degree directions. Therefore, four types of lenses are designed with four different lens thickness (8, 9, 10 and 11 mm) by varying the distance (ff) respectively, where it is found the 45 degree aberration is varied with variation of the distance ff, as shown in FIG. 5. This suggests that there exist ff values at which the 45 degree direction aberration is made zero.

But it is also found that the variation in the 45 degree aberration with varying lens thickness occurs differently; sometimes, the 45 degree aberration cannot be reduced to zero at some thickness values. Besides, if the thickness is too small, the curvatures on the incoming and outgoing sides are too acute, resulting in difficulty in correcting aberration even by introducing any sphericity coefficient. The conditional formula represents the range of thickness values for which the aberrations over the full range, including the 45 degree direction's, may be limited within a practically unproblematic range.

As described above, the anamorphic single lens of the present invention is useful when there arises a need for making the aperture stop configuration elongated elliptical or rectangular in an optical system differing in the focal length between the orthogonal directions, the optical system being one that utilizes a light source such as any semiconductor laser including optical scanners that are used in laser beam printers, etc. Thus, with the radius of the lens surface in each direction determined by the transfer efficiency of the beams required by the overall optical system and the imaging position in each direction, meeting the conditions specified by Formulae 1 and 2, beams of light have an elliptical intensity distribution which is further expanded in the direction of the beams emitted at the larger divergence angle, but which is narrowed in the direction of the beams emitted at the smaller divergence angle at the outgoing surface of a piece of lens, thereby enabling enhancement of the transfer efficiency of the beams. Simultaneously, the image is formed at the imaging position, as required by the overall optical system.

Further, the conditions for imaging performance required by the overall optical system may be met by adopting a construction such that, the first surface, as numbered successively from the light source side, is a toric surface with its first curvature in the direction of the beams emitted at the larger divergence angle being concave, and its second curvature in the direction of the beams emitted at the smaller divergence angle being convex, as seen from the light source, respectively, which are represented by high order expansion terms, being quartic or higher, that contribute to aberration correction only in the direction of the light beams emitted at the smaller divergence angle, and that the second surface on the outgoing side is a toric or cylindrical surface with the curvature in the direction of the beams emitted at the larger divergence angle being convex toward the image surface, which is represented by high order expansion terms that are quartic or higher, that contribute aberration correction only in the direction of the light beams emitted at the larger divergence angle.

Further, by using the anamorphic single lens of this invention in a post-objective type optical scanner, a small sized and low-priced optical scanner can be realized.

Furthermore, it is possible to realize a small-sized and low-priced image forming apparatus by making use of the optical scanner utilizing the anamorphic single lens of the present invention.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

The following describes an anamorphic single lens of an embodiment according to the present invention with reference to the accompanying drawings.

Figure 1:
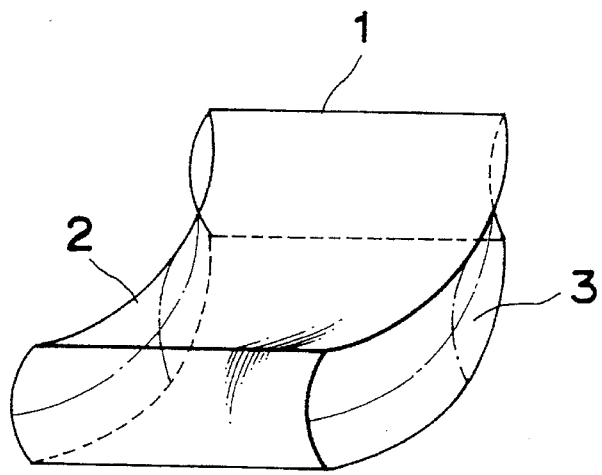
FIG. 1 is a structural diagram of an anamorphic single lens according to the present invention.

FIG. 1 shows a structure of an anamorphic single lens according to an embodiment of the present invention, as utilized in an optical scanner. In FIG. 1, reference numeral 1 denotes an anamorphic single lens; 2 a first surface at the light source side; and 3 a second surface at the image surface side.

FIG. 2 (a) shows a first radius of curvature of the lens and passages of the light beams therethrough in the main scanning direction, and FIG. 2 (b) shows a second radius of curvature of the lens and passage of the light beams therethrough in the sub-scanning direction.

Figure 2A:
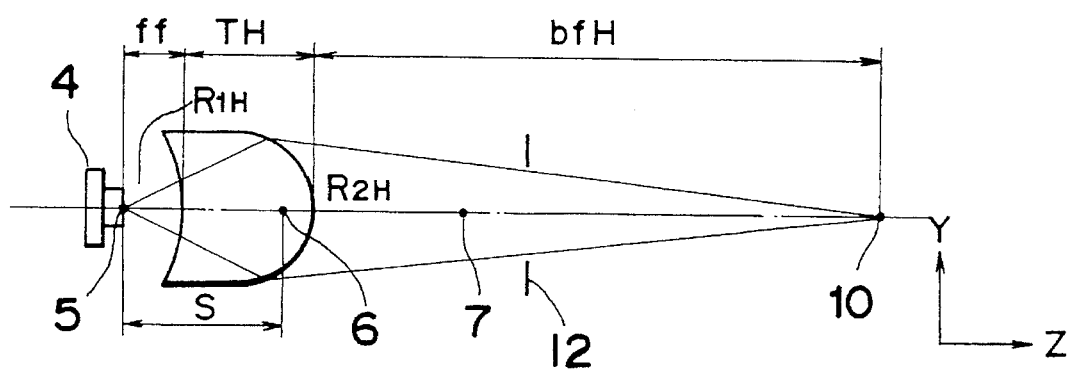
FIGS. 2(a) and 2(b) are schematic diagrams for illustrating the concept of the present invention.
Figure 2B:
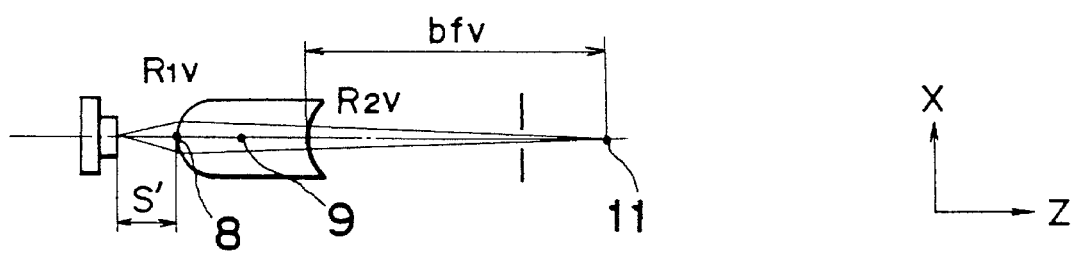

Referring to FIGS. 2(a) and 2(b), reference numeral 4 designates a semiconductor laser serving as a light source; 5 a laser beam emitting point to be a position of the object point; 6 a light source side principal point position in the main scanning direction; 7 an image surface side principal point position in the main scanning direction; 8 a light source side principal point position in the sub-scanning direction; 9 an image surface side principal point position in the sub-scanning direction; 10 an image point position in the main scanning direction; 11 an image point position in the sub-scanning direction; and 12 a long elliptical aperture stop.

The first surface 2 is a toric surface with its first radius of curvature in the main scanning direction being $R_{1H}$ and its second radius of curvature in the sub-scanning direction being $R_{1V}$, which is represented by high order expansion terms that are quartic or higher, where the high order expansion terms contribute to aberration correction only for the light beams in the sub-scanning direction.

The second surface 3 is a toric surface with its first radius of curvature in the main direction being $R_{2H}$ and its second radius of curvature in the sub-scanning direction being $R_{2V}$, which is represented by high order expansion terms that are quartic or higher, where the high order expansion terms contribute to aberration correction only for the light beams in the main scanning direction. Here the high order expansion representing the configuration of the first toric surface 2 is shown by Formulae 3 and 4, as given by the sag from the apex of the surface in the X, Y and Z coordinate system shown in FIGS. 2 (a) and (b). Similar high order expansion for the second toric surface 3 is given by Formulae 5 and 6.

$$Z = f(X) + \frac{1}{2} \cdot \frac{1}{R_{1H}} \{X^2 + Y^2 - f^2(X)\} \quad \text{(Formula 3)}$$

$$f(X) = \frac{\frac{X^2}{R_{1V}}}{1 + \left\{1 - (1+K_V)\left(\frac{X}{R_{1V}}\right)^2\right\}^{1/2}} + \quad \text{(Formula 4)}$$

$$A_V \cdot X^4 + B_V \cdot X^6 + C_V \cdot X^8 + D_V \cdot X^{10}$$

$$Z = f(Y) + \frac{1}{2} \cdot \frac{1}{R_{2V}} \{X^2 + Y^2 - f^2(Y)\} \quad \text{(Formula 5)}$$

$$f(Y) = \frac{\frac{Y^2}{R_{2H}}}{1 + \left\{1 - (1+K_H)\left(\frac{Y}{R_{2H}}\right)^2\right\}^{1/2}} + \quad \text{(Formula 6)}$$

$$A_H \cdot Y^4 + B_H \cdot Y^6 + C_H \cdot Y^8 + D_H \cdot Y^{10}$$

Where in the high order expansion terms which contribute to aberration correction on the main scanning side, $K_H$ represents a conical constant, and $A_H$, $B_H$, $C_H$ and $D_H$ high order coefficients; and in the high order expansion terms which contribute to aberration correction on the sub-scanning side, $K_V$ represents a conical constant, and $A_V$, $B_V$, $C_V$ and $D_V$ high order coefficients.

Then, as shown in FIGS. 2(a) and 2(b), assuming that S represents the distance from the laser light emitting point 5 to the light source side principal point position 6 in the main direction, and S' represents the distance from the laser light emitting point 5 to the light source side principal point position 8 in the sub-direction, TH represents the central lens thickness, ff represents the distance from the laser light emitting point 5 to the first surface 2, $bf_H$ represents the distance from the second surface 3 to the image point position 10 in the main direction, $bf_V$ represents the distance to the image point position 11 in the sub-direction, fm represents the focal length in the main direction, and fs represents the focal length in the sub-direction, exemplified embodiments of physical numerical values are illustrated in Tables 1, 2, 3 and 4, where the design wave length of laser light is 788 nm, and the vitric material of the lens is SF8 where the refractive index at wave length 788 nm is 1.672788.

The following describes the operation of the anamorphic single lens of the present embodiment with reference to FIGS. 1, 2(a) and 2(b).

The semiconductor laser 4 is arranged in such a way that the direction of the laser beams emitted at the larger divergence angle coincides with the main scanning direction. Assuming the divergence angles of beams from the semiconductor laser 4 to be a degree in the main direction and b degree in the sub-direction (where a>b), the intensity distribution of laser beams before coming into the lens should be that of an ellipse represented by the ratio of main direction:sub-direction=tan (a/2):tan (b/2).

The beams of light in the main scanning direction from the semiconductor laser 4 are converted to have a larger divergence angle by the concave first surface, subsequently to be focused by the convex second surface at the imaging position 10, as required by the overall optical scanner. The beams of light in the sub-scanning direction are converted into a convergent pencil of rays by the convex first surface, subsequently to be focused at the imaging position 11 by the second surface, as required by the overall system. The intensity distribution of the beams immediately after going out through such a lens is defined by the ratio of main direction: sub-direction=md:sd, which are represented by the following formulae:

$$md = \tan(a/2) \times S, \text{ and}$$

$$sd = \tan(b/2) \times S'$$

Assuming a=30 (degree) and b=10 (degree) for the semiconductor laser of this embodiment, then resultant md=3.17 and sd=0.29 in the case of the embodiment of Table 1. Thus the condition of S>S' is met, permitting the intensity distribution to be that of a long ellipse further expanded to about 11:1 in the main scanning direction. In this way, the loss in the quantity of light through the long elliptical aperture stop 12 is substantially reduced, thereby making it possible to achieve a high transfer efficiency of the beams as required by the overall optical scanner. The same applies to other embodiments shown in Tables 2 through 4.

Each of the embodiments is so designed as to satisfy the condition of Formula 1, thus minimizing the aberration in the 45 degree direction.

Figure 3:
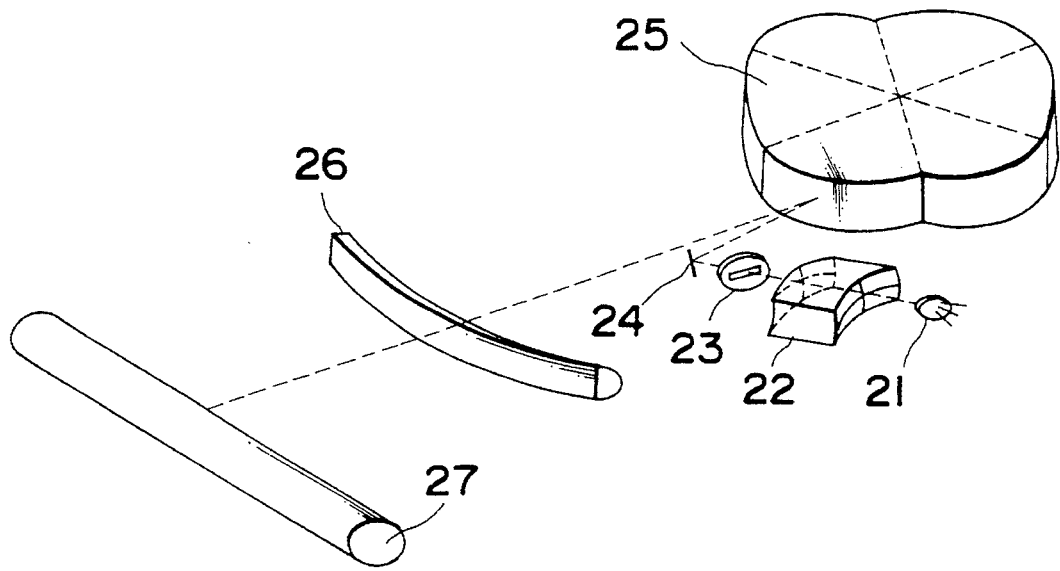
FIG. 3 is a structural diagram of an optical scanner of the present invention.

FIG. 3 shows a construction of an optical scanner in which an anamorphic single lens of the present embodiment is used. Referring to FIG. 3, the beams of light emitted from a semiconductor laser 21 are converted to have a long elliptic intensity distribution by an anamorphic single lens 22, where in the main scanning direction the light beams are turned into a focusing pencil of rays, to be reflected by a mirror 24 after passing through a long elliptical aperture stop 23. In the sub-scanning direction the light beams converted through the anamorphic single lens 22 are focused in the neighborhood of a reflection surface of a polygonal mirror 25 composed of cylindrical or spherical surfaces. The polygonal mirror composed of cylindrical surfaces turns about its rotational center axis, and deflects the incoming laser beams and focuses them through a compensating lens 26 on the photosensitive body 27 to be scanned, while correcting the curvature of field in the main scanning direction.

The position of the compensating lens 26 is so arranged as to make the deflection point on the surfaces of the polygonal mirror 25 and the scanning surface on the photosensitive body 27 geometrical optically conjugate to each other in the sub-scanning direction, thereby not only compensating for the tilt of surface of the polygonal mirror 25 composed of cylindrical surfaces, but compensating for the curvature of field in the sub-scanning direction, with the refractive power in the sub-scanning direction diminishing from the center part toward the peripheral part in the main scanning direction.

With regard to the fθ characteristic, correction is made by electrically changing a signal output clock depending on the scanning position. As described above, in the optical scanner utilizing an anamorphic single lens, a polygonal mirror composed of cylindrical surfaces and a compensating lens, a small low-priced and high resolution optical scanner can be realized.

Figure 4:
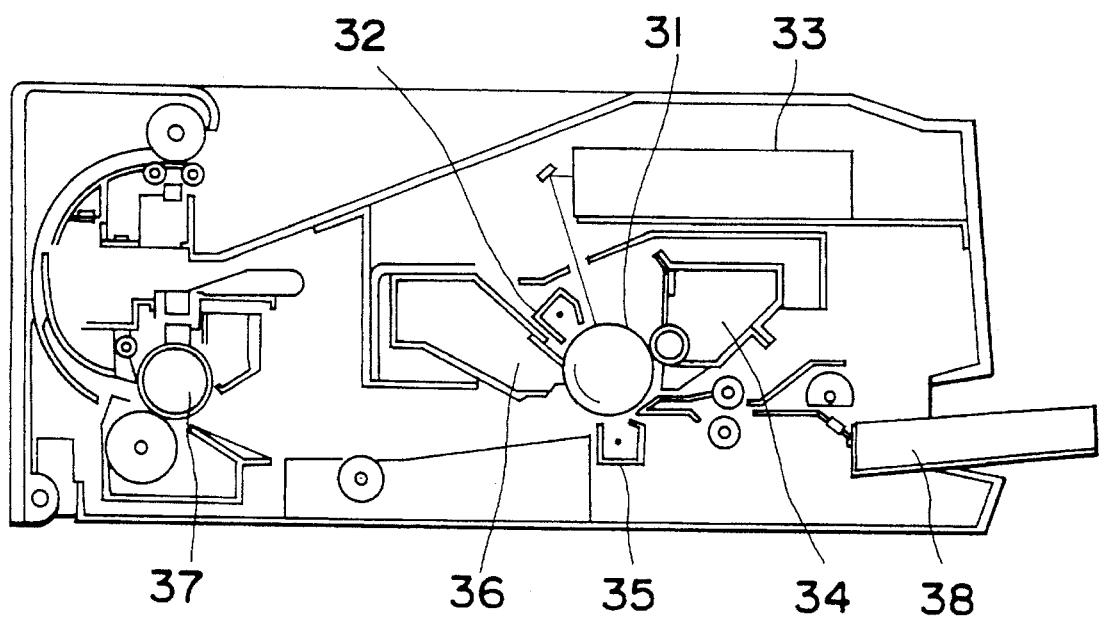
FIG. 4 is a structural diagram of an image forming apparatus according to the present invention.
Figure 5:
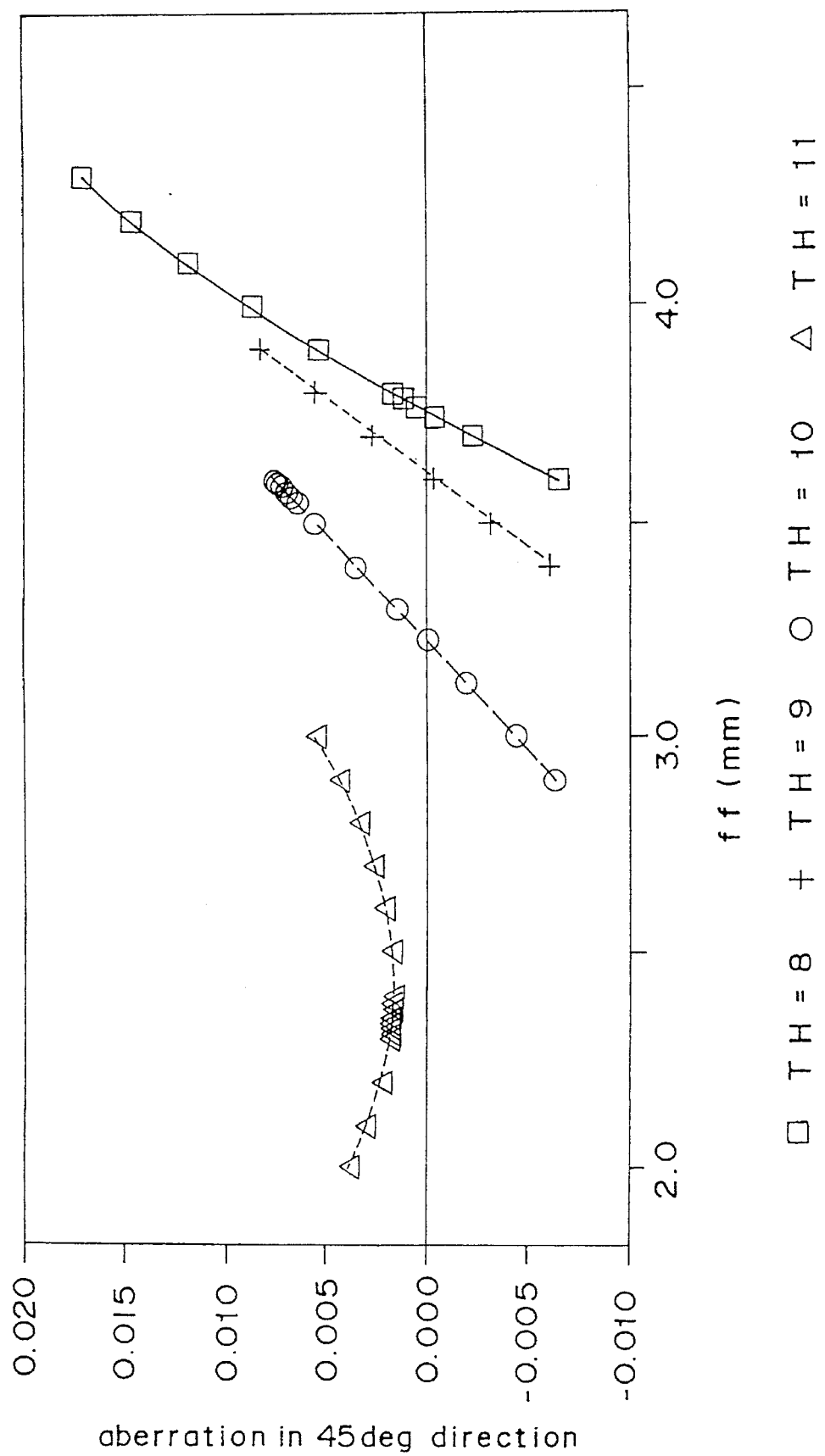
FIG. 5 is an explanatory graph showing changes in the aberration of the anamorphic single lens of the present invention.
Figure 6:
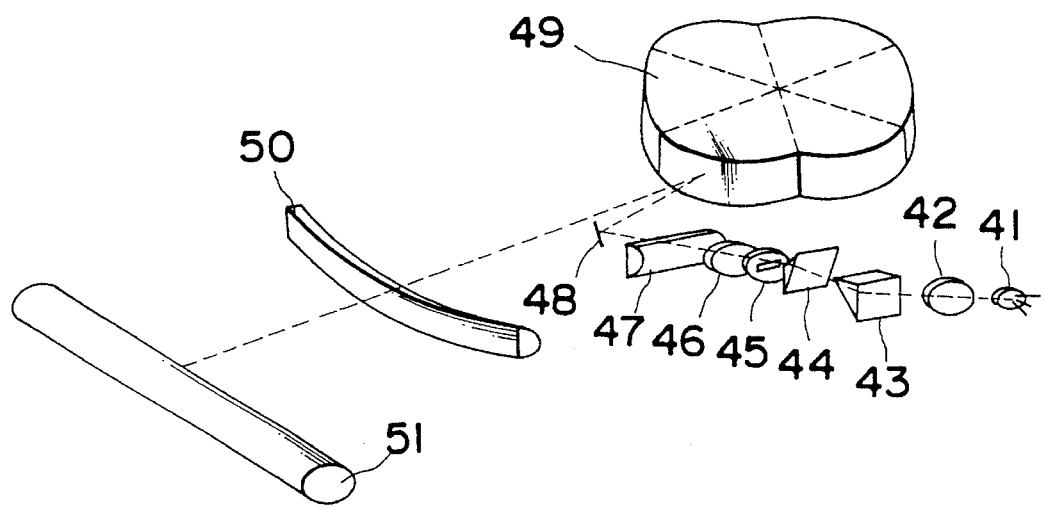
FIG. 6 is a structural diagram of a conventional optical scanner.
Figure 7A:
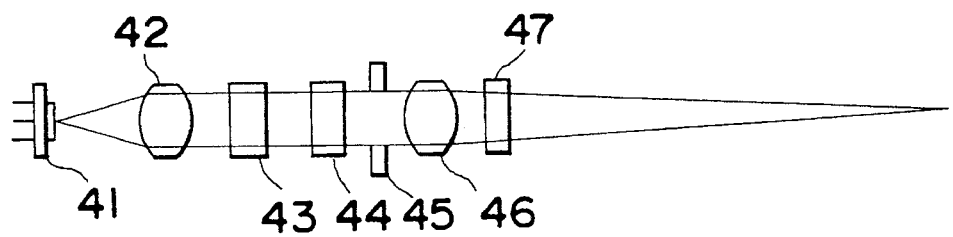
FIGS. 7(a) and 7(b) are schematic diagrams showing the passage of light beams in a conventional optical scanner.
Figure 7B:
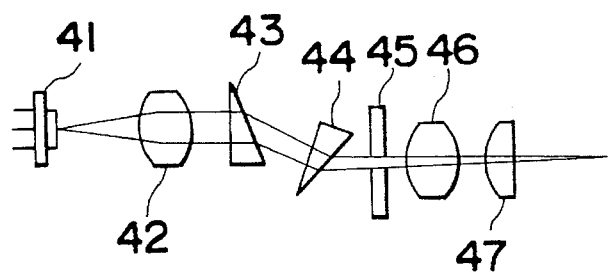

FIG. 4 illustrates the construction of an image forming apparatus in which the optical scanner of the aforementioned embodiment is utilized. Referring to FIG. 4, reference numeral 31 denotes a photosensitive drum whose surface is covered with a photosensitive body in which the charge varies upon the irradiation of light thereon; 32 a corona charging unit which serves for making static ions adhere to and thereby charge the surface of the photosensitive body; 33 the optical scanner of the aforementioned embodiment which writes any printing information on the photosensitive body 31; 34 a developer for depositing charged toner onto a printing part; 35 a corona transfer unit for transferring the deposited toner to a printing sheet; 36 a cleaner for removing residual toner; 37 a print fixing unit for fixing the transferred toner on the sheet; and 38 designates a paper feeding cassette.

As described above, it is possible to realize a small, low-priced image forming apparatus by making use of the optical scanner of the present embodiment.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

TABLE 1

| | | | | | |
|---|---|---|---|---|---|
| $R_{1H}$ | −2.7029 | $R_{1V}$ | 2.2453 | TH | 8 |
| $R_{2H}$ | −4.3146 | $R_{2V}$ | 25.0385 | ff | 3.77 |
| $K_H$ | −3.97930E−01 | $K_V$ | −7.34099E−01 | fm | 10.8 |
| $A_H$ | 2.18881E−05 | $A_V$ | −1.78496E−02 | fs | 3.21 |
| $B_H$ | 7.03154E−07 | $B_V$ | −7.66638E−04 | | |
| $C_H$ | −1.89559E−08 | $C_V$ | 1.67513E−02 | | |
| $D_H$ | 1.34658E−09 | $D_V$ | −1.75090E−02 | | |
| S | 11.82 | S' | 3.36 | | |
| $bf_H$ | 137.2659 | $bf_V$ | 70 | | |

TABLE 2

| | | | | | |
|---|---|---|---|---|---|
| $R_{1H}$ | −3.2096 | $R_{1V}$ | 2.2351 | TH | 9 |
| $R_{2H}$ | −4.7433 | $R_{2V}$ | 54.8385 | ff | 3.6 |
| $K_H$ | −4.04325E−01 | $K_V$ | −2.47634E+00 | fm | 10.8 |
| $A_H$ | 1.48856E−05 | $A_V$ | −1.23479E−04 | fs | 3.24 |
| $B_H$ | 3.57869E−07 | $B_V$ | −2.88800E−03 | | |
| $C_H$ | −1.01931E−08 | $C_V$ | 3.19496E−03 | | |
| $D_H$ | 4.03148E−10 | $D_V$ | 1.15544E−01 | | |
| S | 11.88 | S' | 3.39 | | |
| $bf_H$ | 137.2659 | $bf_V$ | 70 | | |

TABLE 3

| | | | | | |
|---|---|---|---|---|---|
| $R_{1H}$ | −3.3324 | $R_{1V}$ | 2.1351 | TH | 10 |
| $R_{2H}$ | −5.0391 | $R_{2V}$ | −57.8469 | ff | 3.2 |
| $K_H$ | −4.07125E−01 | $K_V$ | −2.68763E+00 | fm | 10.8 |
| $A_H$ | 1.28650E−05 | $A_V$ | −8.50962E−04 | fs | 3.28 |
| $B_H$ | 3.99698E−07 | $B_V$ | −5.21152E−03 | | |
| $C_H$ | −1.68494E−08 | $C_V$ | 7.76519E−03 | | |
| $D_H$ | 5.20370E−10 | $D_V$ | 3.25931E−01 | | |
| S | 11.80 | S' | 3.43 | | |
| $bf_H$ | 137.2659 | $bf_V$ | 70 | | |

TABLE 4

| | | | | | |
|---|---|---|---|---|---|
| $R_{1H}$ | −2.5949 | $R_{1V}$ | 1.8181 | TH | 11 |
| $R_{2H}$ | −5.1168 | $R_{2V}$ | −13.1981 | ff | 2.39 |
| $K_H$ | −4.07660E−01 | $K_V$ | −3.19308E+00 | fm | 10.4 |
| $A_H$ | 1.30857E−05 | $A_V$ | −3.3B390E−03 | fs | 3.37 |
| $B_H$ | 3.54225E−07 | $B_V$ | −2.01399E−02 | | |
| $C_H$ | −1.45443E−08 | $C_V$ | 1.83038E−02 | | |
| $D_H$ | 4.74867E−10 | $D_V$ | −4.37069E+00 | | |
| S | 11.36 | S' | 3.52 | | |
| $bf_H$ | 137.2659 | $bf_V$ | 70 | | |

What is claimed is:

1. An anamorphic single lens having different refractive powers in a first direction of said anamorphic single lens and a second direction of said anamorphic single lens for refracting beams of light from a light source that diverge at a larger divergence angle in the first direction and at a smaller divergence angle in the second direction wherein said anamorphic single lens satisfies the formulae 1 and 2:

$$0.6 < TH/fm < 2, \text{ and} \quad \text{(Formula 1)}$$

$$S' < S, \quad \text{(Formula 2)}$$

where fm is the focal length of said anamorphic single lens in the first direction, TH is the thickness or the lens, S is the distance from the light source side principal point position to the light source in the first direction, and S' is the distance from the light source side principal point position to the light source in the second direction; and wherein said anamorphic single lens has a light source side with a first surface thereon and an outgoing side with a second surface thereon, wherein said first surface is a toric surface having a curvature in the first direction concave in the direction of the light source and a curvature in the second direction convex in the direction of the light source, and wherein said second surface is a toric surface having a curvature in the first direction convex in the direction of the image surface.

2. The anamorphic single lens according to claim 1, wherein said second surface is cylindrical.

3. The anamorphic single lens of claim 1, wherein said first surface has a configuration that is represented by high order expansion terms that are quartic or higher and which contribute to aberration correction only for light beams in the second direction and said second surface has a configuration that is represented by high order expansion terms that are quartic or higher which contribute to aberration correction only for light beams in the first direction.

4. The anamorphic single lens of claim 3, wherein the expansion terms representing the configuration of the first surface is represented by the following Formulae 3 and 4, and the expansion terms representing the configuration of the second surface is represented by the following Formulae 5 and 6:

$$Z = f(X) + \frac{1}{2} \cdot \frac{1}{R_{1H}} \{X^2 + Y^2 - f^2(X)\} \quad \text{(Formula 3)}$$

$$f(X) = \frac{\frac{X^2}{R_{1V}}}{1 + \left\{1 - (1 + K_V)\left(\frac{X}{R_{1V}}\right)^2\right\}^{1/2}} + \quad \text{(Formula 4)}$$

$$A_V \cdot X^4 + B_V \cdot X^6 + C_V \cdot X^8 + D_V \cdot X^{10}$$

$$Z = f(Y) + \frac{1}{2} \cdot \frac{1}{R_{2V}} \{X^2 + Y^2 - f^2(Y)\} \quad \text{(Formula 5)}$$

$$f(Y) = \frac{\frac{Y^2}{R_{2H}}}{1 + \left\{1 - (1 + K_H)\left(\frac{Y}{R_{2H}}\right)^2\right\}^{1/2}} + \quad \text{(Formula 6)}$$

$$A_H \cdot Y^4 + B_H \cdot Y^6 + C_H \cdot Y^8 + D_H \cdot Y^{10}$$

where in the Formulae 5 and 6, the high order expansion terms contribute to aberration correction on a main scanning side, and $K_H$ represents a conical constant, and $A_H$, $B_H$, $C_H$ and $D_H$ are high order coefficients, and where in Formulae 3 and 4, the high order expansion terms contribute to aberration correction on a sub-scanning side, and $K_V$ represents a conical constant, and $A_V$, $B_V$, $C_V$ and $D_V$ high order coefficients, and where $R_{1H}$ is a first radius of curvature of said first surface in a main scanning direction, $R_{1V}$ is a second radius of curvature of said first surface in a sub-scanning direction, $R_{2H}$ is a first radius of curvature of said second surface in the main scanning direction, $R_{2V}$ is a second radius of curvature of said second surface in the sub-scanning direction, and X, Y and Z represent coordinate positions of said first and second surfaces in an orthogonal coordinate system.

5. An optical scanning system, comprising:
   a light source for emitting light beams at different divergence angles between first and second directions;
   an optical deflecting means for deflecting light beams from the light source for scanning on a scanning surface; and
   an anamorphic single lens having different refractive powers in the first direction and the second direction for refracting beams of light from the first direction and at a smaller divergence angle in the second direction, wherein said anamorphic single lens satisfies the formulae 1 and 2:

(Formula 1) 0.6<TH/fm<2, and (Formula 2) S'<S, where fm is the focal length of said anamorphic single lens in the first direction, TH is the thickness of the lens, S is the distance from the light source side principal point position to the light source in the first direction, and S' is the distance from the light source side principal point position to the light source in the second direction; and
   wherein said anamorphic single lens has a light source side with a first surface thereon and an outgoing side with a second surface thereon, wherein said first surface is a toric surface having a curvature in the first direction concave in the direction of the light source and a curvature in the second direction convex in the direction of the light source, and wherein said second surface is a toric surface having a curvature in the first direction convex in the direction of the image surface.

6. The optical scanning system of claim 5, wherein the light beams are emitted from the light source at the larger divergence angle in a horizontal direction, coinciding with a main scanning direction, and the light beams are emitted from the light source at the smaller divergence angle in a vertical direction, coinciding with a sub-scanning direction.

7. The optical scanning system of claim 6, wherein a mirror is located between said anamorphic single lens and said optical deflecting means, and said optical deflecting means comprises a plurality of reflection surfaces, and wherein the beams of light emitted by said light source are converted to have an elongated elliptic intensity distribution by said anamorphic single lens such that a focusing pencil of rays is emitted by said anamorphic single lens in the main scanning direction, and the beams of light are converted to focus in the area of said reflection surfaces of said optical deflecting means in the sub-scanning direction.

8. The optical scanning system of claim 6, and further comprising a compensating lens between said optical deflecting means and a scanning surface of a photosensitive body to be scanned, said compensating lens having a focal length in the sub-scanning direction that varies between a central part of said compensating lens and peripheral parts of said compensating lens as observed in the main compensating direction.

9. The optical scanning system of claim 5, wherein said optical deflecting means comprises a polygonal mirror having a plurality cylindrical surfaces, said polygonal mirror being rotatable about a rotational center axis, and wherein a compensating lens is located so as to receive the beams of light deflected by said polygonal mirror and focus the beams of light on a photosensitive body to be scanned, said compensating lens correcting the field curvature in the main scanning direction.

10. The optical scanning system of claim 5, wherein said optical deflecting means comprises one of a plurality of cylindrical reflecting surfaces and a plurality of 11. An image forming apparatus, comprising:
   an optical scanning system, comprising a light source for emitting light beams at different divergence angles between first and second directions, an optical deflecting means for deflecting light beams from the light source for scanning on a scanning surface, and an anamorphic single lens having different refractive powers in the first direction and the second direction for refracting beams of light from the light source that diverge at a larger divergence angle in the first direction and at a smaller divergence angle in the second direction, wherein said anamorphic single lens satisfies the following formulae 1 and 2:

(Formula 1) 0.6<TH/fm<2, and (Formula 2) S'<S, where fm is the focal length of said anamorphic single lens in the first direction, TH is the thickness of the lens, S is the distance from the light source side principal point position to the light source in the first direction, and S' is the distance from the light source side principal point position to the light source in the second direction, and wherein said anamorphic single lens has a light source side with first surface thereon and an outgoing side with a second surface thereon wherein said first surface is a toric surface having a curvature in the first direction concave in the direction of the light source and a curvature in the second direction convex in the direction of the light source, and wherein said second surface is a toric surface having a curvature in the first direction convex in the direction of the image surface;
   a photosensitive body having the scanning surface to be scanned thereon, said scanning surface adapted to have the charge thereof varied upon irradiation by light beams;
   a charging means for making static ions adhere to and thereby charge the scanning surface of said photosensitive body;
   a developing means for depositing charged toner onto a printing part of said photosensitive body;
   a transfer means for transferring deposited toner to a printing sheet; and
   print fixing means for fixing the transferred toner onto the printing sheet;
   wherein said optical scanning system writes printing information on said photosensitive body.

* * * * *

UNITED STATES PATENT AND TRADEMARK OFFICE
CERTIFICATE OF CORRECTION

PATENT NO. : 5,570,232
DATED : October 29, 1996
INVENTOR(S) : Motonobu YOSHIKAWA et al.

It is certified that error appears in the above-indentified patent and that said Letters Patent is hereby corrected as shown below:

On the title page, item [*] should read:

--Notice: The term of this patent shall not extend beyond the expiration date of Pat. No. 5,255,113.--

Signed and Sealed this

Twenty-fifth Day of February, 1997

Attest:

BRUCE LEHMAN

*Attesting Officer*     *Commissioner of Patents and Trademarks*